United States Patent Office 3,384,493
Patented May 21, 1968

3,384,493
COATED RICE AND METHOD OF
PREPARING SAME
Robert E. Ferrel, Richmond, Calif., assignor to the United States of America as represented by the Secretary of Agriculture
No Drawing. Filed Nov. 4, 1964, Ser. No. 409,028
10 Claims. (Cl. 99—83)

ABSTRACT OF THE DISCLOSURE

Coated white rice having a glazed or vitreous appearance is prepared by coating white (milled) rice with corn syrup and an edible agent which provides the required sheen. Examples of this agent are calcium acetate, calcium citrate, calcium lactate, maltose, galactose, sucrose, and lactose.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for coating rice and the provision of the products as new compositions of matter. Further objects of the invention will be evident from the following description wherein parts and percentages are by weight unless otherwise specified.

Although much of the rice sold for human consumption is in the form of uncoated white rice, some consumers demand a product having a glazed or vitreous appearance. In conventional practice such a product is made in the following manner: White (milled) rice is introduced into a rotating drum together with a small proportion of corn syrup—usually enough to provide about 0.5 to 1% of corn syrup solids based on the weight of the rice. After mixing the rice and corn syrup for a minute or so, talc is added in an amount of about 0.5 to 1%, based on the weight of rice. The mixture is then tumbled in the rotating drum for a period long enough to spread the coating evenly over the grains, dry the coating, and give the grains the desired brilliant appearance. In this procedure, the corn syrup acts primarily as a binder to hold the particles of talc to the rice grains; the talc is essentially to provide the necessary sheen to the grains and impart the necessary free-flowing characteristics.

Although the procedure outlined above has been used for decades, it has the disadvantage that talc is an inedible material which must be washed off the product before cooking. The primary object of this invention is the provision of certain agents to replace talc, these agents being edible so that they can be left in place when the rice is prepared for consumption. These agents are not only edible but have the property of providing the desired sheen so that the product meets the demand of a glazd appearance. Also, the products in accordance with the invention exhibit a free-flowing character which is retained even after long periods of storage. Moreover, the agents of the invention do not alter the natural flavor of the rice.

A preferred class of agents in accordance with the invention comprises the calcium salts of certain organic acids, i.e., calcium acetate, calcium citrate, and calcium lactate. It has also been found that certain sugars can be used as the agents, although they do not give as good results as the aforesaid calcium salts because the products show some tendency to cake slightly on standing. These sugars are maltose, galactose, sucrose, and lactose.

Application of the invention presents no difficulty over the usual coating technique, the only change being needed is the substitution of a selected agent as herein described for the conventional talc. In a typical practice of the invention, the rice to be coated is introduced into a rotating drum and rotation thereof initiated. Corn syrup is then added in the usual amount, i.e., sufficient to provide about 0.5 to 1% of corn syrup solids, based on the weight of rice. The selected agent, preferably in powdered form, is then added, also in an amount of about 0.5 to 1%, based on the weight of rice. Rotation of the drum is continued for a period long enough to coat the grains uniformly and to yield a dry, free-flowing product—this will usually require about 1.5 to 2 hours.

The invention is further demonstrated by the following examples. In these examples, various compounds outside the scope of the invention are included for purposes of comparison.

The coating in each case was carried out as follows: One hundred parts of white, uncoated rice was introduced into a coating drum. Rotation was initiated and two parts of corn syrup (50% solids) was added. Then, one part of the candidate agent was added. Rotation of the drum was continued for 2 hours. The products were then assayed for sheen. Those products which exhibited good sheen were also evaluated for flavor. The substances used and the results obtained are tabulated below:

| Agent used | Sheen [1] | Flavor |
|---|---|---|
| Calcium acetate | 3 | Natural. |
| Calcium propionate | 1 | N.d.[2] |
| Calcium butyrate | 0 | N.d. |
| Calcium laurate | 1 | N.d. |
| Calcium stearate | 0 | N.d. |
| Calcium succinate | 2 | Slightly acrid. |
| Calcium malonate | 1 | N.d. |
| Calcium fumarate | 0 | N.d. |
| Calcium adipate | 0 | N.d. |
| Calcium citrate | 3 | Natural. |
| Calcium lactate | 3 | Do |
| Calcium lacto-phosphate | 2 | Slightly acrid. |
| Calcium malate | 0 | N.d. |
| Calcium tartrate | 0 | N.d. |
| Maltose | 3 | Natural. |
| Galactose | 3 | Do. |
| Sucrose | 2 | Do. |
| Lactose | 2 | Do. |
| Glucose | 1 | N.d. |
| Mannitol | 1 | N.d. |

[1] The sheen of the products was rated on the following scale: 3=excellent; 2=good; 1=fair; 0=no sheen.
[2] "N.d." indicates that flavor was not determined.

It is evident from the above table that the ability of a candidate agent to provide high sheen follows no discernable pattern and is, indeed, an unpredictable characteristic.

Having thus described the invention, what is claimed is:

1. A method for preparing coated rice which comprises coating rice with a mixture of corn syrup and an edible organic compound in an amount sufficient to provide said grains of rice with a shiny appearance, said organic compound being calcium acetate.

2. A method for preparing coated rice which comprises coating rice with a mixture of corn syrup and an edible organic compound in an amount sufficient to provide said grains of rice with a shiny appearance, said organic compound being calcium citrate.

3. A method for preparing coated rice which comprises coating rice with a mixture of corn syrup and an edible organic compound in an amount sufficient to provide said grains of rice with a shiny appearance, said organic compound being calcium lactate.

4. A method for preparing coated rice which comprises coating rice with a mixture of corn syrup and an edible organic compound in an amount sufficient to provide said grains of rice with a shiny appearance, said organic compound being maltose.

5. A method for preparing coated rice which comprises coating rice with a mixture of corn syrup and an edible organic compound in an amount sufficient to provide said grains of rice with a shiny appearance, said organic compound being galactose.

6. A method for preparing coated rice which comprises coating rice with a mixture of corn syrup and an edible organic compound in an amount sufficient to provide said grains of rice with a shiny appearance, said organic compound being sucrose.

7. A method for preparing coated rice which comprises coating rice with a mixture of corn syrup and an edible organic compound in an amount sufficient to provide said grains of rice with a shiny appearance, said organic compound being lactose.

8. As a new composition of matter, white rice coated with corn syrup solids and an edible organic compound in an amount sufficient to provide said rice grains with a shiny appearance, said organic compound being calcium acetate.

9. As a new composition of matter, white rice coated with corn syrup solids and an edible organic compound in an amount sufficient to provide said rice grains with a shiny appearance, said organic compound being calcium citrate.

10. As a new composition of matter, white rice coated with corn syrup solids and an edible organic compound in an amount sufficient to provide said rice grains with a shiny appearance, said organic compound being calcium lactate.

References Cited

UNITED STATES PATENTS

| | | |
|---|---|---|
| 2,379,335 | 6/1945 | Baker. |
| 2,498,573 | 2/1950 | Ozai-Durrani _____ 90—80 |
| 2,712,499 | 7/1955 | La Pierre _____ 99—80 X |
| 2,775,521 | 12/1956 | Mateles et al. _____ 99—80 X |
| 2,791,509 | 5/1957 | Cosler _____ 99—166 |
| 2,824,009 | 2/1958 | Lindow _____ 99—166 |
| 2,831,770 | 4/1958 | Antoshkiw _____ 99—83 X |

RAYMOND N. JONES, *Primary Examiner.*